(12) United States Patent
Zhang et al.

(10) Patent No.: US 12,052,771 B2
(45) Date of Patent: Jul. 30, 2024

(54) RANDOM ACCESS METHOD AND USER EQUIPMENT

(71) Applicant: SHARP KABUSHIKI KAISHA, Sakai (JP)

(72) Inventors: Chongming Zhang, Shanghai (CN); Renmao Liu, Shanghai (CN); Chao Luo, Shanghai (CN); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 274 days.

(21) Appl. No.: 17/606,752

(22) PCT Filed: Apr. 27, 2020

(86) PCT No.: PCT/CN2020/087202
§ 371 (c)(1),
(2) Date: Oct. 26, 2021

(87) PCT Pub. No.: WO2020/221197
PCT Pub. Date: Nov. 5, 2020

(65) Prior Publication Data
US 2022/0217787 A1    Jul. 7, 2022

(30) Foreign Application Priority Data
Apr. 30, 2019    (CN) .......................... 201910366719.X

(51) Int. Cl.
*H04W 74/0833* (2024.01)
*H04L 1/1812* (2023.01)
(Continued)

(52) U.S. Cl.
CPC ....... *H04W 74/0841* (2013.01); *H04L 1/1812* (2013.01); *H04L 5/0053* (2013.01);
(Continued)

(58) Field of Classification Search
CPC ......... H04W 74/0841; H04W 72/0446; H04W 72/0453; H04W 74/008; H04W 74/0866;
(Continued)

(56) References Cited

U.S. PATENT DOCUMENTS

2018/0070278 A1* 3/2018 Uemura ................ H04W 76/10
2018/0116000 A1* 4/2018 Ly ........................ H04W 74/006
(Continued)

FOREIGN PATENT DOCUMENTS

CN    110679104 A    1/2020

OTHER PUBLICATIONS

Nokia et al. "On 2-step RACH Procedure", R1-1904716, 3GPP TSG RAN WG1 #96bis, Xi'an, China, Apr. 8-12, 2019.

*Primary Examiner* — Michael K Phillips
(74) *Attorney, Agent, or Firm* — ScienBiziP, P.C.

(57) ABSTRACT

The present invention provides a random access method and user equipment. The random access method includes: user equipment (UE) transmitting a message A to a base station, wherein the message A includes a preamble and a payload of the message A; the user equipment (UE) receiving a message B transmitted by the base station and serving as a response message to the message A; determining whether the message B includes a contention resolution ID of the UE; and upon determining that the message B includes the contention resolution ID of the UE, generating a media access control layer control information (MAC CE), or a media access control layer protocol data unit (MAC PDU), or hybrid automatic repeat request acknowledgement (HARQ-ACK) information to indicate acknowledgement information related to the message B.

5 Claims, 4 Drawing Sheets

(51) Int. Cl.
*H04L 5/00* (2006.01)
*H04W 72/0446* (2023.01)
*H04W 72/0453* (2023.01)
*H04W 74/00* (2009.01)
*H04W 74/08* (2009.01)

(52) U.S. Cl.
CPC ............... *H04W 72/0446* (2013.01); *H04W 72/0453* (2013.01); *H04W 74/008* (2013.01); *H04W 74/0866* (2013.01)

(58) Field of Classification Search
CPC ............ H04W 74/0833; H04L 1/1812; H04L 5/0053; H04L 1/1822; H04L 1/1854; H04L 1/1861; H04L 1/1896; H04L 5/0055
See application file for complete search history.

(56) References Cited

U.S. PATENT DOCUMENTS

| | | | |
|---|---|---|---|
| 2019/0230685 A1* | 7/2019 | Park | H04L 5/0094 |
| 2020/0229238 A1* | 7/2020 | Zhang | H04L 1/0026 |
| 2021/0100036 A1* | 4/2021 | Kim | H04W 28/02 |
| 2021/0329703 A1* | 10/2021 | Yang | H04L 5/001 |
| 2021/0329704 A1* | 10/2021 | Yang | H04W 72/23 |
| 2022/0150973 A1* | 5/2022 | Lim | H04W 72/1268 |
| 2022/0167320 A1* | 5/2022 | Lee | H04W 72/23 |
| 2023/0284282 A1* | 9/2023 | Rastegardoost | H04W 74/04 370/329 |

* cited by examiner

RANDOM ACCESS METHOD AND USER EQUIPMENT

TECHNICAL FIELD

The present invention relates to the field of wireless communication technologies. More specifically, the present invention relates to a random access method and user equipment.

BACKGROUND

During a random access procedure performed by UE, a signaling procedure is shown in FIG. 1 and includes 4 steps (steps S101 to S104), and therefore the random access procedure is referred to as a four-step random access procedure (namely, 4-step RA).

In order to shorten the time to complete the random access procedure, a two-step random access procedure (namely, 2-step RA) is currently under discussion. A signaling procedure thereof is shown in FIG. 2, and includes two steps. In step 201, UE transmits a message A (MSG A) to a base station, wherein the MSG A includes a preamble and a MSG A payload.

In the 4-step RA procedure, transmission of a message 4 includes the following steps.

Firstly, the UE monitors a PDCCH. When a DCI format is obtained by means of monitoring, if a CRC thereof is scrambled by a TC-RNTI, then downlink control information (DCI) included therein is received and decoded. The DCI includes PDSCH time-domain and frequency-domain resources of the message 4 transmitted by the base station or of the transmitted message 4 received by the UE (may be referred to as scheduling information of the message 4 or scheduling information of the PDSCH), and further includes information related to the time domain and the frequency domain of the PUCCH used by the UE to feed back acknowledgement information related to the message 4 (may be referred to as scheduling information of the PUCCH).

The UE firstly receives the message 4 according to the information in the DCI. If the message 4 is decoded correctly, and if the message 4 includes a contention resolution ID (CRID) of the UE, then the UE considers that contention is successfully resolved, and the UE instructs a physical layer to perform acknowledgement on a transport block carrying the message 4. After receiving the instruction, the physical layer transmits ACK information on the aforementioned PUCCH.

Such acknowledgement information enables the base station to determine that the UE has correctly received the message 4 carrying the CRID, so that the base station can continue to schedule the UE to perform data transmission. If the UE does not receive the acknowledgement information, then the UE may probably not receive the message 4 correctly, and therefore the base station can retransmit the message 4 until the acknowledgement information is received.

In the 4-step RA procedure, the CRID is carried in the message IV. In the 2-step RA procedure, the CRID of the UE is carried in a MSG B. If acknowledgement on the MSG B is not performed, then the base station cannot determine whether the UE has correctly received the MSG B. Therefore, issues that need to be addressed include how to generate acknowledgement information related to a MSG B and how to transmit the acknowledgement information.

SUMMARY OF INVENTION

In order to address at least a part of the aforementioned issues, the present invention provides a random access method and user equipment.

According to a first aspect of the present invention, a random access method is provided, and comprises: user equipment (UE) transmitting a message A to a base station, wherein the message A includes a preamble and a payload of the message A; the user equipment (UE) receiving a message B, transmitted by the base station, serving as a response message to the message A; determining whether the message B includes a contention resolution ID of the UE; and upon determining that the message B includes the contention resolution ID of the UE, generating a media access control layer control information (MAC CE), or a media access control layer protocol data unit (MAC PDU), or hybrid automatic repeat request acknowledgement (HARQ-ACK) information to indicate acknowledgement information related to the message B.

In the aforementioned random access method, regarding the acknowledgement information related to the message B, the UE may transmit to the base station the MAC CE carrying the acknowledgement information.

In the aforementioned random access method, the MAC CE carrying the acknowledgement information may include a MAC subheader, the MAC subheader includes a field used to carry a specific logical channel ID, and the specific logical channel ID indicates that the MAC CE is used for acknowledgement on the message B.

In the aforementioned random access method, regarding the acknowledgement information related to the message B, the UE may transmit to the base station the MAC PDU carrying padding bit information.

In the aforementioned random access method, regarding the acknowledgement information related to the message B, the UE may generate the HARQ-ACK information corresponding to a PDSCH carrying the message B and transmit the HARQ-ACK information to the base station.

In the aforementioned random access method, the message B may further include an uplink grant (UL grant), and the UL grant is used to transmit the acknowledgement information related to the message B.

In the aforementioned random access method, the UL grant may be used to transmit the MAC CE or the MAC PDU indicating the acknowledgement information related to the message B.

In the aforementioned random access method, the message B further includes PUCCH-related information, and a PUCCH corresponding to the PUCCH-related information is used to transmit the HARQ-ACK information indicating the acknowledgement information related to the message B.

In the aforementioned random access method, upon determining that the message B does not include the contention resolution ID of the UE, the UE may perform at least one of the following operations: the UE considering that the current random access procedure is not completed; the UE processing the UL grant received in the message B, and indicating the UL grant to a lower layer; the UE transmitting the message A payload on the UL grant received in the message B.

According to a second aspect of the present invention, user equipment is provided, and comprises: a processor; and a memory, storing instructions, wherein when run by the processor, the instructions perform the random access method according to the context.

DETAILED DESCRIPTION

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
LTE: Long Term Evolution
eLTE: enhanced Long Term Evolution
RRC: Radio Resource Control (layer)
MAC: Medium Access Control (layer)
MAC CE: MAC Control Element
MSG 3: Message 3
PRACH: Physical Random Access Channel
PUSCH: Physical Uplink Shared Channel
PDSCH: Physical Downlink Shared Channel
CCCH: Common Control Channel
UL grant: Uplink grant
DL assignment: Downlink assignment
HARQ: Hybrid Automatic Repeat reQuest
ACK: Acknowledgement
NACK: Negative ACK
RRC: Radio Resource Control
RNTI: Radio Network Temporary Identity
RA-RNTI: Random Access RNTI
MAC PDU: Media Access Control (layer) Protocol Data Unit
RAPID: Random Access Preamble Identifier A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communications system, and is applicable to other base stations and UE devices, such as base stations and UE devices supporting eLTE.

Figure 1:
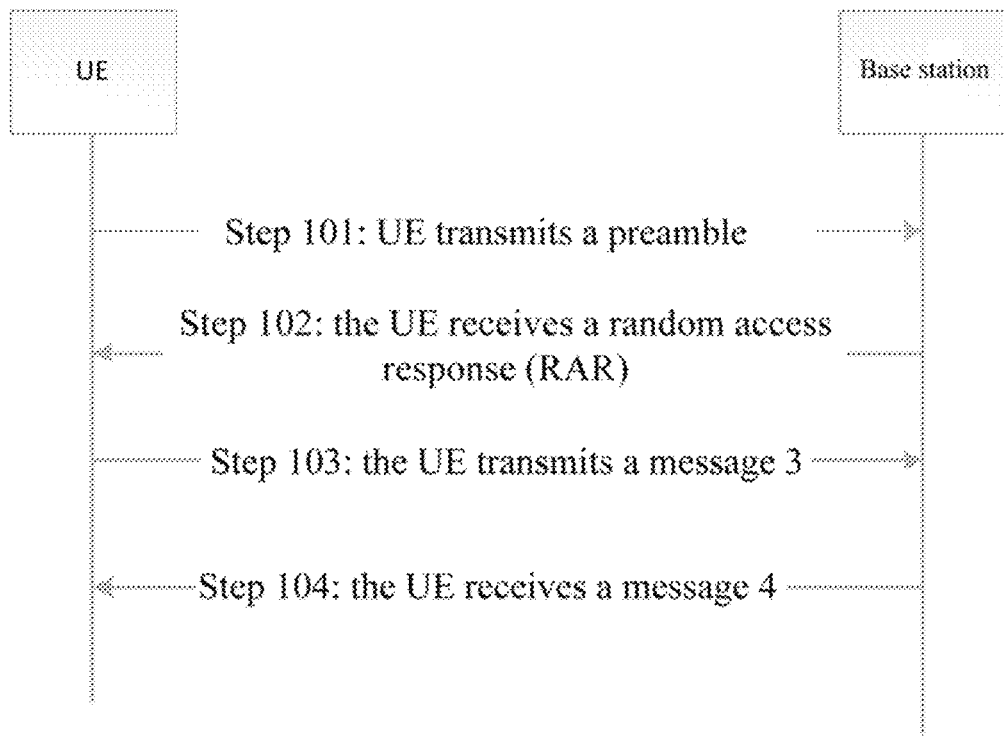
FIG. 1 is a schematic sequence diagram showing a four-step random access procedure serving as a random access procedure.
Figure 2:
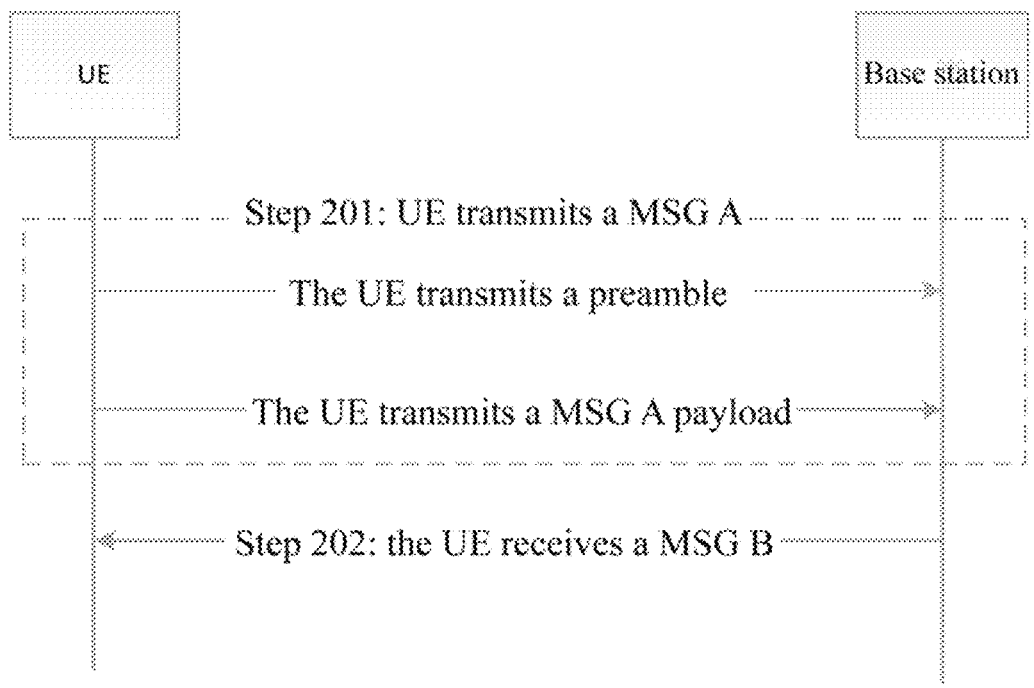
FIG. 2 is a schematic sequence diagram showing a two-step random access procedure serving as a random access procedure.

In order to shorten the time required for random access, "two-step random access" (2-step RA) procedure is currently under discussion. As shown in FIG. 2, two-step random access performed by UE generally includes the following steps.

Step 201, UE transmits a message A (MSG A) to a base station.

The message A includes a preamble and a message A payload.

The preamble is transmitted on a PRACH, and the message A payload is transmitted on a PUSCH. The message A payload is packaged into a MAC PDU and is transmitted on the PUSCH. The message A payload carries information used for contention resolution, such as a contention resolution identity (CRID) or a C-RNTI of the UE. In the following, an example in which the CRID is used as the information for contention resolution is provided. When the UE obtains a valid C-RNTI, the C-RNTI may also be used as the information for contention resolution, and other relevant solutions herein are used.

Step 202, the UE receives a message B (MSG B) transmitted by the base station.

The message B includes information for contention resolution, such as a contention resolution ID. If the CRID detected in the MSG B received by the UE is the same as the CRID transmitted by the UE in the MSG A, then the UE may consider that the contention is resolved.

For example, upon determining that the message B includes the contention resolution ID of the UE, the UE may generate a MAC CE or a MAC PDU or HARQ-ACK information to indicate acknowledgement information related to the message B.

The reception of the MSG B may include the following steps.

After transmitting the MSG A, the UE monitors the PDCCH; when a DCI format is detected, if a CRC thereof is scrambled by an RA-RNTI, then the UE receives and decodes the DCI format, and obtains DCI included therein. The DCI included in the DCI format carries time-domain and frequency-domain information used to receive the PDSCH carrying the MSG B.

The "time-domain and frequency-domain information used to receive the PDSCH carrying the MSG B" may be referred to as scheduling information of the MSG B or scheduling information of the PDSCH, and may also be referred to as a downlink assignment.

The UE receives the MSG B on the PDSCH on the basis of this information. In this case, the MSG B is included in a transport block, and this transport block (TB) is transmitted on the PDSCH. The UE receives the TB, and decodes the same. If the decoding is successful, then the MSG B therein can be extracted to obtain the information carried by the MSG B.

Figure 4:
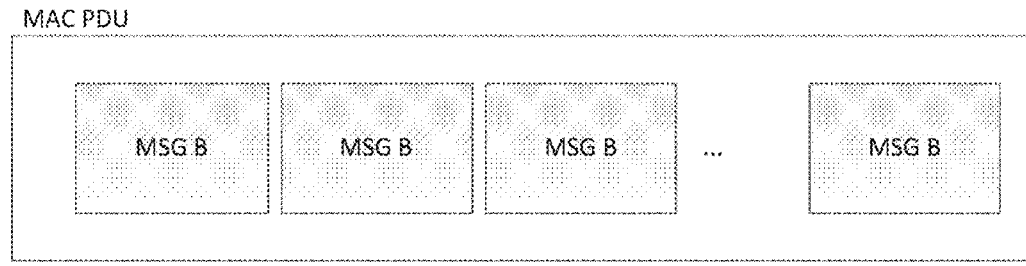
FIG. 4 is a diagram schematically showing an example of a data structure of a MAC PDU.

It should be noted that this TB includes one MAC PDU. This MAC PDU may carry a plurality of MSG Bs as shown in FIG. 4. It can be considered that each MSG B is a MAC sub PDU and a plurality of MAC sub PDUs (for example, a plurality of MSG Bs) form a MAC PDU.

From the perspective of the UE, it can be considered that only one of the MSG Bs is transmitted to the UE. Therefore, this step can be referred to as the UE receiving the MSG B. However, the UE actually receives a response message of the base station to the MSG A. Since a plurality of UEs transmit MSG As at the same timing or on the same PRACH resource, the UE actually receives a response message of the base station to the plurality of MSG As transmitted by the plurality of UEs at this timing.

Nominally, such response message to a plurality of MSG As can be referred to as a MSG B, and such MSG B includes a plurality of response messages. It can also be understood that the MSG B serves as a response message to only one MSG A. In this case, the UE receives a response message of the base station to a plurality of MSG As in step 2, and such response message includes a plurality of MSG Bs.

In the following embodiments, an example in which the MSG B serves as a response message to only one MSG A is used to describe the solutions. One response message may include a plurality of MSG Bs. However, if it is considered that the MSG B includes a plurality of response messages, then the concept of the response message and the concept of the MSG B can be interchanged, and such interchange does not affect implementation of the solutions herein.

In addition, the downlink control information (DCI) described below may include a downlink assignment, and may further include an uplink scheduling grant. The downlink assignment includes at least a modulation and coding scheme, resource allocation, and HARQ information relevant to the downlink shared channel. The uplink scheduling grant includes at least a modulation and coding scheme, resource allocation, and HARQ information relevant to the uplink shared channel.

The downlink control information refers to information used for downlink control. A lot of information belongs to downlink control information, such as a downlink assignment, an uplink scheduling grant, etc.

Different DCI formats can be defined according to different content/fields included therein and belonging to the downlink control information. The CRC of the DCI format is scrambled by an RNTI, and the UE can distinguish different DCI formats according to the RNTI used to scramble the CRC.

The DCI described herein corresponds to downlink control information included in a certain DCI format, and the CRC of such DCI format is scrambled by a certain RNTI. For simplicity of description, the DCI scrambled by the RNTI described herein actually refers to DCI included in a DCI format having a CRC scrambled by a specific RNTI.

In addition, since the DCI is transmitted on the PDCCH, and since the CRC of the DCI format of this DCI is scrambled by a certain RNTI, it can be understood that when an address of a PDCCH transmission is based on one RNTI or when the PDCCH transmission is a PDCCH transmission addressed to one RNTI, description for the DCI is equivalent to description for a DCI format having a CRC scrambled by a certain RNTI.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

In embodiment 1, two-step random access is described in detail, and a method for generating acknowledgement information in the random access procedure is mainly described.

In step 0, UE transmits a MSG A.

In step 1, the UE receives a MSG B.

Specifically, the UE may receive, in a PDDCH, DCI scrambled by an RA-RNTI, and the DCI carried therein includes scheduling information of a PDSCH. The UE receives a transmitted TB on the PDSCH, and successfully decodes the same to obtain a MSG B carried therein.

In step 2, detection is performed on the MSG B to determine whether the MSG B includes a CRID of the UE. This CRID refers to a CRID carried in a payload of the MSG A transmitted by the UE to a base station, and therefore the CRID is referred to as a CRID of the UE. Since a plurality of MSG Bs may exist, the UE may need to perform detection on each of the MSG Bs.

In step 2.1, if the MSG B includes the CRID of the UE, then the UE generates acknowledgement information related to the MSG B.

Another possible implementation manner for step 2 may be as follows.

If a detection result indicates that the MSG B includes the CRID of the UE, then the UE considers that contention is resolved or that the random access procedure is successfully completed.

If the UE considers that the contention is resolved or that the random access procedure is successfully completed, then the UE generates acknowledgement information related to the MSG B.

Since the acknowledgement information of the MSG B may be in various forms, methods for generating the same may vary. For example, a method for generating the acknowledgement information may be as follows.

The acknowledgement information of the MSG B may be a MAC CE. This MAC CE carries the acknowledgement information (confirmation/acknowledge) related to the MSG B, and is herein referred to as an ACK MAC CE.

When the base station receives the ACK MAC CE or a MAC PDU including the ACK MAC CE, it can be determined that the UE has successfully received the MSG B.

The ACK MAC CE may include only a MAC subheader, and the MAC subheader may have a length of one byte (8 bits). A field exists in the MAC subheader included in the ACK MAC CE, and is used to carry a specific logical channel ID. This specific logical channel ID indicates/notifies that this MAC CE is used for acknowledgement (confirmation/acknowledge) of the MSG B.

In this case, a generation procedure thereof may be as follows: the UE instructs a multiplexing and assembly entity to generate an ACK MAC CE, and preferably instructs the multiplexing and assembly entity to cause the MAC CE to be included in a next or upcoming uplink transmission, and preferably obtains a MAC PDU used for transmission from the multiplexing and assembly entity.

In addition, another method for generating the acknowledgement information may be, for example, as follows.

The acknowledgement information of the MSG B may also be a MAC PDU. This MAC PDU carries padding bit information (padding). When the base station receives such MAC PDU, it can be determined that the UE has successfully received the MSG B.

In this case, a generation procedure thereof may be as follows: the UE instructs the multiplexing and assembly entity to generate a MAC PDU, and preferably obtains a MAC PDU used for transmission from the multiplexing and assembly entity.

Moreover, yet another method for generating the acknowledgement information may be, for example, as follows.

The acknowledgement information of the MSG B may also be HARQ-ACK information. When the UE receives a PDSCH, HARQ-ACK information corresponding to the PDSCH may be generated on a physical layer. When the UE receives a PDSCH carrying the MSG B, correspondingly, HARQ-ACK information corresponding to the PDSCH may be generated on the physical layer. This HARQ-ACK information can be understood as the acknowledgement information related to the MSG B.

In this case, a generation procedure thereof may also be as follows: the UE instructs the physical layer to generate acknowledgement information related to this TB. This TB refers to a TB carrying the aforementioned MSG B. The generation procedure may also be directly described as follows: the UE instructs the physical layer to generate acknowledgement information related to the MSG B.

Correspondingly, the physical layer generates HARQ-ACK information bit information corresponding to the TB (or the MSG B), and transmits the same to the base station. The value of the HARQ-ACK information bit information is preferably ACK (positive acknowledge).

Particularly, an implementation manner in which the UE instructs the physical layer to generate acknowledgement information related to the TB carrying the MSG B is provided in embodiment 4.

In addition, preferably, step 2.1 may further include the following procedure: if the MSG B includes the CRID of the UE, then the UE considers that the contention is resolved.

Embodiment 2

Embodiment 2 of the present invention will be described in detail below. Embodiment 2 differs from embodiment 1 in that embodiment 2 further provides a method for transmitting the acknowledgement information generated in step 2.1 in embodiment 1.

According to the description for embodiment 1, the acknowledgement information may be a MAC CE or a MAC PDU, and may also be HARQ-ACK information. Therefore, methods for transmitting the acknowledgement information include, for example, the following methods.

Method I, the MSG B includes the CRID of the UE, and carries a UL grant.

This UL grant is used to transmit the acknowledgement information in embodiment 1. Preferably, the UL grant may be used to transmit the MAC CE or the MAC PDU indicating the acknowledgement information described in embodiment 1. In order to highlight a difference between this UL grant and other UL grants, this UL grant may be specified as a UL grant received in the same MSG B when the UE detects, in the MSG B, the CRID transmitted by the UE in the MSG A, and this UL grant may also be specified as a UL grant obtained from the MSG B or from a PDCCH scrambled by an RA-RNTI when the UE considers that the contention is resolved.

This UL grant schedules a PUSCH transmission, and the aforementioned MAC CE or MAC PDU can be transmitted on the PUSCH. Therefore, this UL grant includes at least scheduling information of the PUSCH, namely, time-domain information and frequency-domain information used to transmit the PUSCH or relevant information used to obtain the time-domain information and frequency-domain information used to transmit the PUSCH.

The UE may use a dedicated uplink HARQ process to execute or process an uplink transmission on a UL grant received in the MSG B. Preferably, this HARQ process has a number different from the number of an HARQ process regarding an uplink transmission on a UL grant received in a random access response (RAR) executed in a 4-step random access procedure.

A specific acknowledgement information transmission procedure may be at least one of the following operations.

When the UE receives a UL grant in the MSG B, preferably, the received UL grant is a UL grant used to transmit the acknowledgement information, and the UE processes the value of the received UL grant and indicates the same to a lower layer such as a physical layer.

When the UE receives a UL grant in the MSG B, preferably, the received UL grant is a UL grant used to transmit the acknowledgement information, and an HARQ process layer corresponding thereto is instructed to trigger a new transmission or a first transmission.

When the UE receives a UL grant in the MSG B, preferably, the received UL grant is a UL grant used to transmit the acknowledgement information, and a MAC PDU used for transmission is obtained. The UE may obtain the MAC PDU used for transmission from a MSG B buffer, and may also obtain the MAC PDU used for transmission from the multiplexing and assembly entity. Preferably, the obtained MAC PDU may at least include the MAC CE capable of providing acknowledgement information described in embodiment 1, and may also be the MAC PDU generated according to the instruction and capable of providing acknowledgement information described in embodiment 1.

When the UE obtains the MAC PDU used for transmission, the MAC PDU and the received UL grant are delivered to a corresponding HARQ process. The HARQ process stores the UL grant, and instructs the physical layer to generate a transmission of the TB according to the stored UL grant. This TB carries the obtained MAC PDU used for transmission.

Method II, the MSG B includes the CRID, and includes PUCCH-related information, which is referred to simply as PUCCH allocation. This PUCCH is used to transmit HARQ-ACK information generated by the physical layer according to the instruction from the UE.

Specific carrying schemes may include the following schemes.

Scheme I, the PUCCH-related information is included in the DCI, and this DCI further carries time-domain and frequency-domain information used to transmit the PDSCH of the MSG B. That is, this DCI carries PDSCH scheduling information used to transmit the MSG B, and preferably, this DCI is scrambled by an RA-RNTI.

Scheme II, the PUCCH-related information is included in the MSG B.

Figure 5:
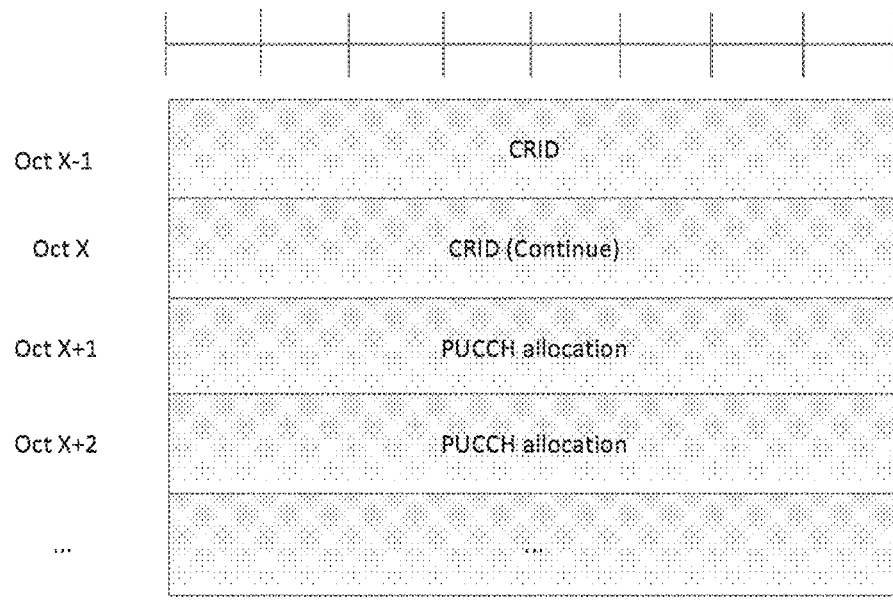
FIG. 5 is a diagram showing an example of fields included in an MSG B.

Preferably, the PUCCH-related information may be included in the content of the MSG B in the form of a field. FIG. 5 shows an example in which the content of the MSG B includes at least the following fields:

CRID, indicating the contention resolution ID; and PUCCH allocation, indicating the PUCCH-related information.

Figure 6:
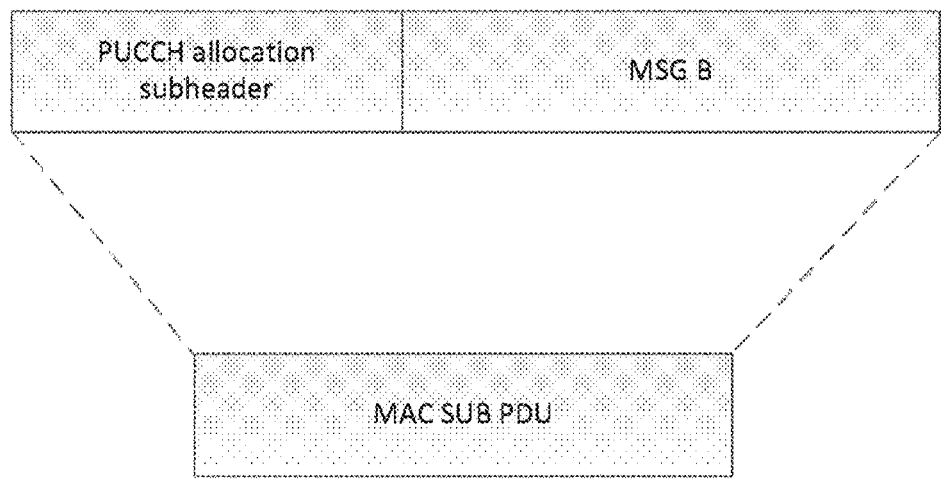
FIG. 6 is a diagram schematically showing an example of a data structure of a MAC SUB PDU.

In addition, in an example shown in FIG. 6, the PUCCH-related information may also be carried in a MAC subheader and be cascaded with the MSG B in the form of the MAC subheader to form a MAC SUB PDU.

The PUCCH-related information includes at least the time-domain information and/or the frequency-domain information of the PUCCH or information used to determine the time-domain information and/or the frequency-domain information of the PUCCH, and it is described herein that the PUCCH-related information includes the scheduling information of the PUCCH. The PUCCH-related information may specifically include a PUCCH resource indicator indicating distribution of frequency resources, and may further include a PDSCH-to-HARQ_feedback timing indicator indicating a timing for feedback of the HARQ-ACK information, namely an interval from a timing when the UE completes reception of the PDSCH to a timing when HARQ feedback is performed, so as to indirectly indicate timing distribution of the PUCCH. The "reception of the PDSCH" refers to reception of the PDSCH transmitting the MSG B.

Scheme III, another possible implementation manner for the case in which the PUCCH-related information includes at least the time-domain and frequency-domain information is as follows:

a part of the PUCCH-related information is carried in the DCI, and this DCI further carries the time-domain and frequency-domain information of the PDSCH used to transmit the MSG B. That is, this DCI carries PDSCH scheduling information used to transmit the MSG B, and preferably, this DCI is scrambled by an RA-RNTI. Preferably, the part of the PUCCH-related information may refer to time-domain information, such as the PDSCH-to-HARQ_feedback timing indicator indicating a timing for feedback of the HARQ-ACK information, namely a timing for transmission of the PUCCH. The remaining part of the PUCCH-related information is carried in the MSG B. Preferably, the part of the PUCCH-related information may refer to frequency-domain information, such as the PUCCH resource indicator indicating distribution of frequency resources. The specific carrying scheme may be selected from the various methods described in scheme II, and the description will not be repeated.

A specific acknowledgement information transmission procedure may be as follows: on the physical layer, the UE determines time-domain and frequency-domain resources of the PUCCH according to the PUCCH-related information, and reports/transmits corresponding HARQ-ACK information on the determined PUCCH.

It should be noted that in aforementioned scheme II, the MSG Bs and the PUCCHs are in one-to-one correspondence. That is, if the CRID in the MSG B is the same as a CRID transmitted by a certain UE, then the UE can use the PUCCH corresponding to the MSG B to perform transmission.

However, in aforementioned scheme I, the following issue occurs: a plurality of MSG Bs may be transmitted on the same PDSCH. If the DCI carries only one PUCCH resource, then a plurality of UEs transmit information on the same PUCCH resource. Acknowledgement information transmitted by the UE on the same PUCCH resource results in mutual interference, so that the base station cannot correctly perform decoding. In order to avoid this case, a solution is provided in embodiment 6.

As an example, embodiments 1 and 2 can be combined to resolve the issues regarding generation and transmission of the acknowledgement information.

Embodiment 3

Embodiment 3 of the present invention will be described in detail below. Embodiment 3 differs from embodiment 1 and embodiment 2 in that embodiment 3 provides a solution for the case in which the MSG B does not include any CRID.

When the MSG B does not include the CRID of the UE, preferably, if the MSG B includes a RAPID corresponding to the preamble transmitted by the UE in the MSG A, then the UE may perform at least one of the following operations.

The UE considers that 2-step RA is not completed.

The UL grant received in the MSG B is processed, and is indicated to a lower layer.

The UE considers that the 2-step RA needs to perform a fall back operation, that is, the UE will transmit the MSG A payload on the UL grant indicated in the MSG B (if the MSG A payload is stored in a MSG 3 buffer, then it can be considered that the UE will transmit the MSG 3 on the UL grant indicated in the MSG B), and perform corresponding operations, for example, starting a contention resolution timer after completion of transmission of the MSG A (or MSG 3) payload, and monitoring a downlink PDCCH to detect whether DCI carried in the MSG B and scrambled by an RNTI exists.

When the UE receives a UL grant in the MSG B, an HARQ process layer corresponding thereto is instructed to trigger a new transmission or a first transmission.

When the UE receives a UL grant in the MSG B, a MAC PDU used for transmission is obtained: if the contention resolution is not successful, or if the contention is not resolved, or if the received MSG B does not have the CRID of the UE, then this UL grant is used to transmit the MSG A payload: the UE obtains, from a MSG A buffer, a MAC PDU to be transmitted. The MSG A buffer refers to a buffer storing a MAC PDU carrying the MSG A payload.

Preferably, if the MAC PDU carrying the MSG A payload is stored in the MSG 3 buffer, and if the contention resolution is not successful, or if the contention is not resolved, or if the received MSG B does not have any CRID, then the UE can obtain, from the MSG 3 buffer, the MAC PDU to be transmitted. It can be understood that in this case, the UE transmits the MSG 3, and this MSG 3 is transmitted on the UL grant indicated in the MSG B.

It should be noted that when the UE receives a UL grant in the MSG B, if the contention resolution is successful, or if the received MSG B has the CRID of the UE, then this UL grant is used to transmit the acknowledgement information described in embodiment 1 or 2: the UE needs to obtain a MAC PDU used for transmission from the multiplexing and assembly entity as described in embodiment 1 and embodiment 2.

When the UE obtains the MAC PDU used for transmission, the MAC PDU and the received UL grant are delivered to a corresponding HARQ process. The HARQ process stores the UL grant, and instructs the physical layer to generate a transmission of the TB according to the stored UL grant. This TB carries the obtained MAC PDU used for transmission.

Embodiment 4

Embodiment 4 of the present invention will be described in detail below. As described in embodiment 1, the acknowledgement information of the MSG B may also be HARQ-ACK information, and the HARQ-ACK information needs to be generated on the physical layer. Therefore, a generation procedure thereof may also be that the UE instructs the physical layer to generate acknowledgement information related to the TB carrying the MSG B.

An implementation manner for this generation procedure may include the following:

the UE receives the MSG B, or rather, the UE receives the TB carrying the MSG B; and the UE uses a dedicated downlink HARQ process to process the reception of the MSG B, or associates a transmission indicated by the RA-RNTI with a dedicated HARQ process. The "transmission indicated by the RA-RNTI" refers to a transmission indicated by DCI scrambled by the RA-RNTI, that is, the DCI scrambled by the RA-RNTI carries time-domain and frequency-domain information (or referred to as scheduling information) of this transmission. Therefore, this transmission may be referred to as a transmission indicated by the RA-RNTI or a transmission relevant to the RA-RNTI.

For simplicity of description, this dedicated HARQ process is referred to as a "MSG B HARQ process" herein.

The MSG B HARQ process can indicate, by inserting an HARQ process number/index field in the DCI, an HARQ process serving as the MSG B HARQ process. Preferably, this DCI further carries information used by the UE to receive the MSG B, such as the time-domain and frequency-domain information used to receive the MSG B, namely the scheduling information of the MSG B, and preferably, this DCI is scrambled by the RA-RNTI.

In addition, the dedicated HARQ process may also be implemented in a predefined manner, for example, a downlink HARQ process X is designated to process a downlink transmission indicated by the MSG B. X may be any integer from 0 to 16.

On the basis that a corresponding MSG B HARQ process is determined, processing performed by the UE on the MSG B may specifically include at least one of the following steps.

(a) When a DL assignment is related to the MSG B, the UE allocates to the MSG B HARQ process a TB received on a PDSCH corresponding to this DL assignment.

(b) If an HARQ process allocated to the received TB is the MSG B HARQ process, then the UE considers that this transmission is a new transmission or a first transmission.

(c) The HARQ process processes the received TB, wherein this step may specifically include the following steps.

(c.1) A MAC entity of the UE decodes the received TB, wherein this step may specifically include the following:

if the decoding is successful, then a decoded MAC PDU is delivered to a disassembly and demultiplexing entity; and if the decoding is not successful, and if the HARQ process is the MSG B HARQ process, then the TB may be discarded.

(c.2) If this HARQ process is the MSG B HARQ process, and if the contention is successfully resolved, then the UE instructs the physical layer to generate acknowledgement information (acknowledge) corresponding to data of the TB.

(c.3) If this HARQ process is the MSG B HARQ process, but if the contention is not successfully resolved (or if the contention is not resolved), then the UE does not instruct the physical layer to generate acknowledgement information corresponding to the data of the TB.

Another implementation manner for this generation procedure may include the following: the UE receives the MSG B; if the MSG B includes the CRID of the UE, or if the UE considers that the contention resolution is successful, then the UE instructs the physical layer to generate acknowledgement information (confirmation/acknowledge information) corresponding to the data of the TB, or the UE instructs the physical layer to generate acknowledgement information (confirmation/acknowledge information) corresponding to the MSG B.

As an example, embodiment 4 can be combined with embodiment 1 to resolve generation of the acknowledgement information.

In addition, as an example, embodiment 4 can also be combined with embodiment 2 to resolve generation and transmission of the acknowledgement information.

Embodiment 5

Embodiment 5 of the present invention will be described in detail below. In embodiments 1-4, the UE performs acknowledgement on the MSG B, so that the base station can directly learn whether the UE has correctly received the MSG B. In this embodiment, a method is provided so that the base station can indirectly learn whether the UE has correctly received the MSG B.

In a case, the MSG B carries a downlink assignment (DL assignment), and the downlink assignment indicates scheduling information of a PDSCH that the UE needs to receive, namely, time-domain and frequency-domain information needed by the UE to receive the PDSCH, or information that the UE can use to determine the time-domain and frequency-domain information for reception of the PDSCH. This PDSCH may be referred to as a PDSCH scheduled by the DL assignment, and a transmission on this PDSCH may be referred to as a downlink transmission indicated by the MSG B.

After receiving the MSG B, the UE may receive, according to the DL assignment therein, the PDSCH scheduled by the DL assignment, and feed back HARQ-ACK information corresponding to the PDSCH transmission, so that the base station can learn whether the UE has correctly received the PDSCH scheduled by the DL assignment and therefore can determine whether the UE has correctly received the MSG B. Only when the UE has correctly received the MSG B, can the PDSCH scheduled by the DL assignment be received, and can feedback of the HARQ-ACK information be performed for the PDSCH.

A specific procedure of "receiving the PDSCH, and feeding back HARQ-ACK information corresponding to the PDSCH" may include the following steps.

(1) The UE receives a TB transmitted on the PDSCH indicated by the DL assignment. This DL assignment is included in the MSG B.

(2) The UE processes the TB, wherein this step may specifically be as follows: the UE uses a dedicated downlink HARQ process to process a downlink transmission indicated by the MSG B, or rather, to process the PDSCH transmission scheduled by the DL assignment carried in the MSG B, or rather, to process the TB transmitted on the PDSCH scheduled by the DL assignment carried in the MSG B.

For simplicity of description, this dedicated HARQ process is referred to as a "MSG B DL HARQ process" herein.

The MSG B DL HARQ process can indicate, by inserting an HARQ process number/index field in the DCI, an HARQ process serving as a MSG B HARQ process. Preferably, this DCI further carries information used by the UE to receive the MSG B, such as the time-domain and frequency-domain information used to receive the MSG B, namely the scheduling information of the MSG B, and preferably, this DCI is scrambled by the RA-RNTI.

In addition, the dedicated HARQ process may also be implemented in a predefined manner, for example, a downlink HARQ process X is designated to process a downlink transmission indicated by the MSG B. X may be any integer from 0 to 16.

On the basis that a corresponding MSG B DL HARQ process is determined, processing performed by the UE on the TB may specifically include at least one of the following operations.

(a) When a DL assignment is related to the MSG B DL HARQ process, the UE allocates the received TB to this HARQ process.

Alternatively, regarding the DL assignment received in the MSG B, if the contention is successfully resolved, then the received TB is allocated to the MSG B DL HARQ process.

(b) If an HARQ process allocated to the received TB is the MSG B DL HARQ process, then the UE considers that this transmission is a new transmission or a first transmission.

(c) A MAC entity of the UE decodes the received TB, wherein this step specifically includes the following:

(c.1) if the decoding is successful, then this MAC PDU is delivered to an upper layer (for example, an RRC layer above a MAC layer), or to a disassembly and demultiplexing entity; and (c.2) if the decoding is not successful, then the physical layer is instructed to store the TB decoded by this MAC layer entity in a soft buffer, and if data is already stored in the soft buffer, then the existing data is replaced with data of this TB.

(d) Then, the UE instructs the physical layer to generate acknowledgement information corresponding to the data of the TB. On the physical layer, for a TB that is successfully decoded, the generated acknowledgement information may be ACK, and for a TB that is not successfully decoded, the generated acknowledgement information may be NACK. On the physical layer, both the ACK and the NACK are generally referred to as HARQ-ACK information.

(3) The UE transmits the HARQ-ACK information generated in (2).

The HARQ-ACK information may be transmitted on the PUCCH. In order to transmit the HARQ-ACK information, the UE needs to determine a PUCCH resource. Therefore, preferably, the MSG B may carry PUCCH-related information used to determine a PUCCH resource.

Specific carrying schemes may include the following schemes.

Scheme I, the PUCCH-related information is carried in the DCI, and this DCI further carries time-domain and frequency-domain information used to transmit the MSG B. That is, this DCI carries scheduling information of the MSG B, and preferably, this DCI is scrambled by an RA-RNTI.

Scheme II, the PUCCH-related information is carried in the MSG B.

Figure 7:
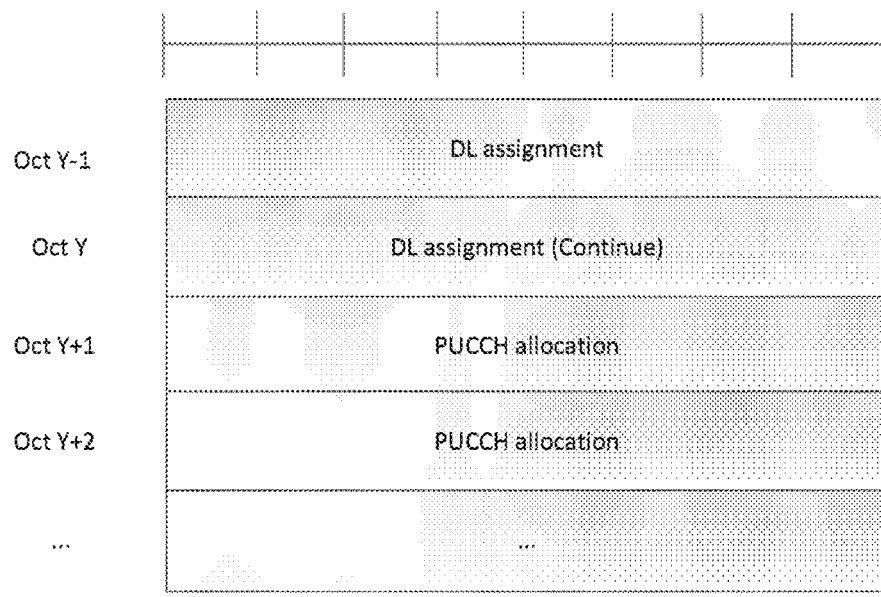
FIG. 7 is a diagram showing an example of fields included in an MSG B.

Preferably, the PUCCH-related information may be carried in the content of the MSG B in the form of a field. FIG. 7 shows an example in which the content of the MSG B includes at least the following fields:

DL assignment, which is scheduling information of a PDSCH that the UE needs to receive, namely, time-domain and frequency-domain information needed by the UE to receive the PDSCH, or information that the UE can use to determine the time-domain and frequency-domain information for reception of the PDSCH; and PUCCH allocation, indicating the PUCCH-related information.

In addition, in an example shown in FIG. 6, the PUCCH-related information may also be cascaded with the MSG B in the form of a MAC subheader to form a MAC SUB PDU, wherein the MSG B includes at least a DL assignment field.

The PUCCH-related information includes at least the time-domain information and/or the frequency-domain information of the PUCCH or information used to determine the time-domain information and/or the frequency-domain information of the PUCCH, and it is described herein that the PUCCH-related information carries the scheduling information of the PUCCH. The PUCCH-related information may specifically include a PUCCH resource indicator indicating distribution of frequency resources, and may further include a PDSCH-to-HARQ_feedback timing indicator indicating a timing for feedback of the HARQ-ACK information, namely an interval from a timing when the UE completes reception of the PDSCH to a timing when HARQ feedback is performed, so as to indirectly indicate timing distribution of the PUCCH. The "reception of the PDSCH" refers to reception of the PDSCH indicated by the DL assignment carried in the MSG B.

Scheme III, another possible implementation manner for the case in which the PUCCH-related information includes at least the time-domain and frequency-domain information is as follows:

a part of the PUCCH-related information is carried in the DCI, and this DCI further carries the time-domain and frequency-domain information of the PDSCH used to transmit the MSG B. That is, this DCI carries PDSCH scheduling information used to transmit the MSG B, and preferably, this DCI is scrambled by an RA-RNTI. Preferably, the part of the PUCCH-related information may refer to time-domain information, such as the PDSCH-to-HARQ_feedback timing indicator indicating a timing for feedback of the HARQ-ACK information, namely a timing for transmission of the PUCCH. The remaining part of the PUCCH-related information is carried in the MSG B. Preferably, the remaining part of the PUCCH-related information may refer to frequency-domain information, such as the PUCCH resource indicator indicating distribution of frequency resources. The specific carrying scheme may be selected from the various methods described in scheme II of this embodiment, and the description will not be repeated.

A specific HARQ-ACK information transmission procedure may be as follows:

on the physical layer, the UE determines time-domain and frequency-domain resources of the PUCCH according to the PUCCH-related information, and provides corresponding HARQ-ACK information on the determined PUCCH.

It should be noted that in aforementioned scheme II or III, the MSG Bs and the PUCCHs are in one-to-one correspondence. That is, if the CRID in the MSG B is the same as a CRID transmitted by a certain UE, then the UE can use the PUCCH corresponding to the MSG B to perform transmission.

However, in aforementioned scheme I, the following issue occurs: a plurality of MSG Bs may be transmitted on the same PDSCH. If the DCI carries only one PUCCH resource, then a plurality of UEs transmit information on the same PUCCH resource. Acknowledgement information transmitted by the UE on the same PUCCH resource results in mutual interference, so that the base station cannot correctly perform decoding. In order to avoid this case, a solution is provided in embodiment 7.

Embodiment 6

Embodiment 6 of the present invention will be described in detail below. In order to resolve the issue regarding correspondence between the PUCCH and the MSG B, a feasible solution is to insert a plurality of PUCCH resources in the DCI, wherein each PUCCH resource corresponds to a MSG B carrying a CRID. For example, if the UE detects 6 MSG Bs carrying CRIDs in a response message, and if the second MSG B includes the CRID transmitted by the UE in the MSG A, then the UE feeds back/transmits, on a PUCCH resource ranked second in the DCI, the acknowledgement information generated in embodiment 1.

Another feasible solution is to design a DCI format. The DCI format carries scheduling information of the PUCCH. A CRC of the DCI format is scrambled by an RNTI, and the RNTI is herein referred to as an X-RNTI.

The MSG B received by the UE carries the CRID of the UE, and further carries the X-RNTI.

When the UE completes reception of the MSG B, or rather, when the UE completes reception of a PDSCH transmission carrying the MSG B, the UE starts to monitor the PDCCH. When a DCI format is detected, if a CRC of this DCI format is scrambled by the X-RNTI, then DCI information carried in the DCI format is received. The DCI carries the scheduling information of the PUCCH, and the UE uses this PUCCH to feed back/transmit the acknowledgement information generated in embodiment 1.

Since X-RNTIs allocated to different UEs are different, the UE may obtain, according to the X-RNTI thereof, a PUCCH resource used to feed back the acknowledgement information, which does not cause any conflict.

As described above, information about the PUCCH resource may include at least a PUCCH resource indicator indicating distribution of frequency resources, and may further include a PDSCH-to-HARQ_feedback timing indicator indicating a timing for feedback of the HARQ-ACK information, namely timing distribution corresponding to the PUCCH resource. This information can indicate a time interval from a timing when the UE completes reception of the PDSCH to a timing when HARQ feedback is performed. The "reception of the PDSCH" refers to reception of the PDSCH transmitting the MSG B. Since a plurality of UEs receiving the same response message (including a plurality of MSG Bs) may feed back the acknowledgement information by means of the PUCCH on different frequency-domain resources at the same timing, another feasible solution is as follows:

the DCI including the PDSCH scheduling information used to transmit the MSG B further includes a part of the PUCCH-related information, such as the time-domain information of the PUCCH. For example, the DCI includes a field PDSCH-to-HARQ_feedback timing indicator indicating a timing for feedback of the HARQ-ACK information, namely, a timing for transmission of the PUCCH. Preferably, the CRC of this DCI is scrambled by the RA-RNTI. For all UEs receiving the DCI, if the UE needs to transmit the acknowledgement information by means of the PUCCH, then the UE can determine a timing for transmission of the PUCCH according to the field-PDSCH-to-HARQ_feedback timing indicator included in the DCI.

The remaining part of the PUCCH-related information such as the frequency-domain information of the PUCCH may be inserted in the MSG B according to the method provided in scheme II in embodiment 2. Therefore, if UE needs to transmit the acknowledgement information of the MSG B by means of the PUCCH, then the UE may obtain time-domain information of the PUCCH resource from the DCI carrying the scheduling information of the PDSCH used to transmit the MSG B, and may also obtain the frequency-domain information of the PUCCH from the MSG B.

The following optimization can be further made to the aforementioned method: a network is pre-configured with a part of the PUCCH-related information, such as the time-domain information of the PUCCH. Therefore, with reference to the remaining part of the PUCCH-related information received in the MSG B, such as the frequency-domain information of the PUCCH, the UE can determine a PUCCH resource so as to transmit the acknowledgement information.

As an example, embodiment 6 can be combined with embodiments 1 and 2.

Embodiment 7

Embodiment 7 of the present invention will be described in detail below. In order to resolve the issue regarding correspondence between the PUCCH and the MSG B, a feasible solution is to insert a plurality of PUCCH resources in the DCI, wherein each PUCCH resource corresponds to a MSG B carrying a CRID and a DL assignment. For example, if the UE detects 6 MSG Bs carrying CRIDs in a response message, and if the second MSG B includes the CRID transmitted by the UE in the MSG A, then the UE feeds back/transmits, on a PUCCH resource ranked second in the DCI, the acknowledgement information generated in embodiment 5.

Another feasible solution is to design a DCI format. The DCI format carries scheduling information of the PUCCH. A CRC of the DCI format is scrambled by an RNTI, and the RNTI is herein referred to as a Y-RNTI.

The MSG B received by the UE carries the CRID of the UE and the DL assignment, and further carries the Y-RNTI.

When the UE completes reception of the MSG B, or rather, when the UE completes reception of a PDSCH transmission carrying the MSG B, the UE starts to monitor the PDCCH. When a DCI format is detected, if a CRC of this DCI format is scrambled by the Y-RNTI, then the UE receives DCI information carried in the DCI format. The DCI carries the scheduling information of the PUCCH, and the UE uses this PUCCH to feed back/transmit the acknowledgement information generated in embodiment 5.

Since Y-RNTIs allocated to different UEs are different, the UE may obtain, according to the Y-RNTI thereof, a PUCCH resource used to feed back the acknowledgement information, which does not cause any conflict.

As described above, information about the PUCCH resource may include at least a PUCCH resource indicator indicating distribution of frequency resources, and may further include a PDSCH-to-HARQ_feedback timing indicator indicating a timing for feedback of the HARQ-ACK information, namely timing distribution corresponding to the PUCCH resource. This information can indicate a time interval from a timing when the UE completes reception of the PDSCH to a timing when HARQ feedback is performed. The "reception of the PDSCH" refers to reception of the PDSCH scheduled by the DL assignment. Since a plurality of UEs receiving the same response message (including a plurality of MSG Bs) may feed back the acknowledgement information by means of the PUCCH on different frequency-domain resources at the same timing, another feasible solution is as follows:

the DCI including the PDSCH scheduling information used to transmit the MSG B further includes a part of the PUCCH-related information, such as the time-domain information of the PUCCH. For example, the DCI includes a field PDSCH-to-HARQ_feedback timing indicator indicating a timing for feedback of the HARQ-ACK information, namely, a timing for transmission of the PUCCH. Preferably, the CRC of this DCI is scrambled by the RA-RNTI. For all UEs receiving the DCI, if the UE needs to transmit the acknowledgement information by means of the PUCCH, then the UE can determine a timing for transmission of the PUCCH according to the field-PDSCH-to-HARQ_feedback timing indicator included in the DCI.

The remaining part of the PUCCH-related information such as the frequency-domain information of the PUCCH may be inserted in the MSG B according to the method provided in scheme II in embodiment 5.

Therefore, if UE needs to transmit the acknowledgement information in embodiment 5 by means of the PUCCH, then the UE may obtain time-domain information of the PUCCH resource from the DCI carrying the scheduling information of the PDSCH used to transmit the MSG B, and may also obtain the frequency-domain information of the PUCCH from the MSG B.

The following optimization can be further made to the aforementioned method: a network is pre-configured with a part of the PUCCH-related information, such as the time-domain information of the PUCCH. Therefore, with reference to the remaining part of the PUCCH-related information received in the MSG B, such as the frequency-domain information of the PUCCH, the UE can determine a PUCCH resource so as to transmit the acknowledgement information in embodiment 5.

As an example, embodiment 7 can be combined with embodiment 5.

Figure 3:
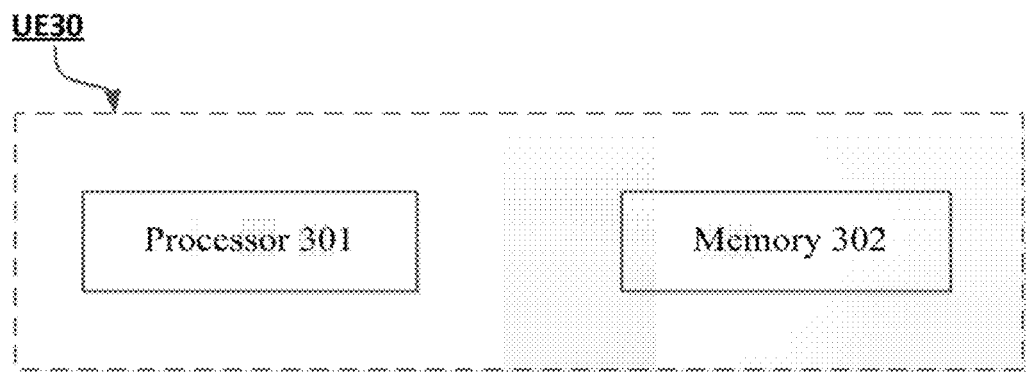
FIG. 3 is a block diagram showing user equipment (UE) involved in the present invention.

In addition, FIG. 3 is a block diagram showing user equipment (UE) involved in the present invention. As shown in FIG. 3, the user equipment (UE) 50 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. When run by the processor 301, the instructions can perform the random access method described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A random access method performed by a user equipment (UE), the method comprising:
    transmitting a message A to a base station, wherein the message A includes a preamble and a payload of the message A;
    receiving a message B from the base station, wherein the message B is received on a physical downlink shared channel (PDSCH) and the message B includes, only for the UE, a UE contention resolution ID, a physical uplink control channel (PUCCH) resource indicator, and a hybrid automatic repeat request (HARQ) feedback time indicator;
    causing a physical layer to generate and transmit hybrid automatic repeat request acknowledgement (HARQ-ACK) information, wherein a value of the HARQ-ACK information is acknowledgement (ACK); and
    transmitting, at a timing indicated by the HARQ feedback time indicator, the HARQ-ACK information on a PUCCH resource indicated by the PUCCH resource indicator.

2. A user equipment (UE), comprising:
transmitting circuitry configured to transmit a message A to a base station, wherein the message A includes a preamble and a message A payload;
receiving circuitry configured to receive a message B from the base station, wherein the message B is received on a physical downlink shared channel (PDSCH) and the message B includes, only for the UE, a UE contention resolution ID, a physical uplink control channel (PUCCH) resource indicator, and a hybrid automatic repeat request (HARQ) feedback time indicator; and
processing circuitry configured to cause a physical layer to generate and transmit hybrid automatic repeat request acknowledgement (HARQ-ACK) information, wherein a value of the HARQ-ACK information is acknowledgement (ACK), wherein
the transmitting circuitry is further configured to transmit, at a timing indicated by the HARQ feedback time indicator, the HARQ-ACK information on a PUCCH resource indicated by the PUCCH resource indicator.

3. The UE according to claim 2, wherein
the message B is a response message to the message A.

4. A base station, comprising:
receiving circuitry configured to receive a message A from a user equipment (UE), wherein the message A includes a preamble and a payload of the message A;
transmitting circuitry configured to transmit a message B to the UE, wherein the message B is transmitted on a physical downlink shared channel (PDSCH) and the message B includes, only for the UE, a UE contention resolution ID, a physical uplink control channel (PUCCH) resource indicator, and a hybrid automatic repeat request (HARQ) feedback time indicator, wherein
the receiving circuitry is further configured to receive, at a timing indicated by the HARQ feedback time indicator, hybrid automatic repeat request acknowledgement (HARQ-ACK) information on a PUCCH resource indicated by the PUCCH resource indicator.

5. The base station according to claim 4, wherein
the message B is a response message to the message A.

* * * * *